June 18, 1968 — R. E. FOSTER — 3,388,555
SELF-STRAINING EAVES TROUGH
Filed Oct. 22, 1965
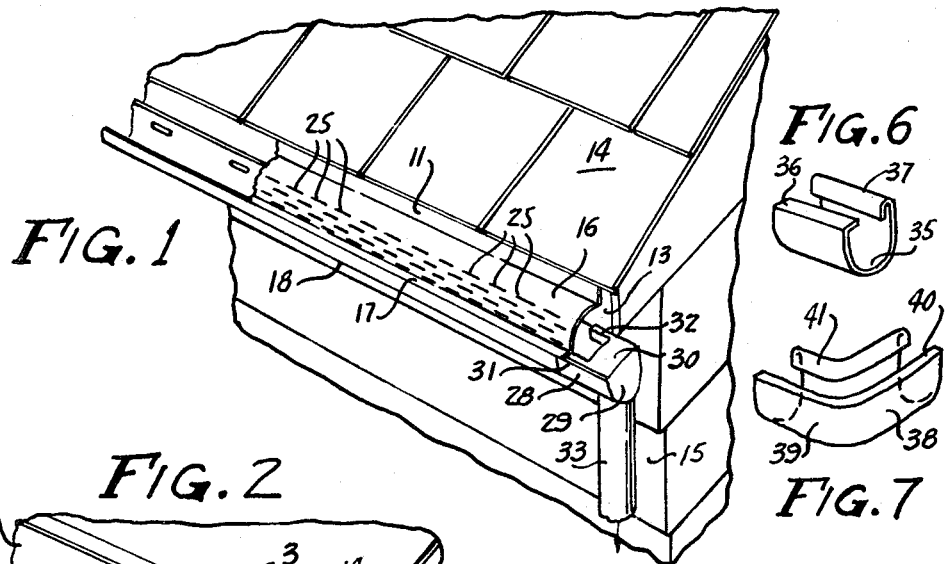
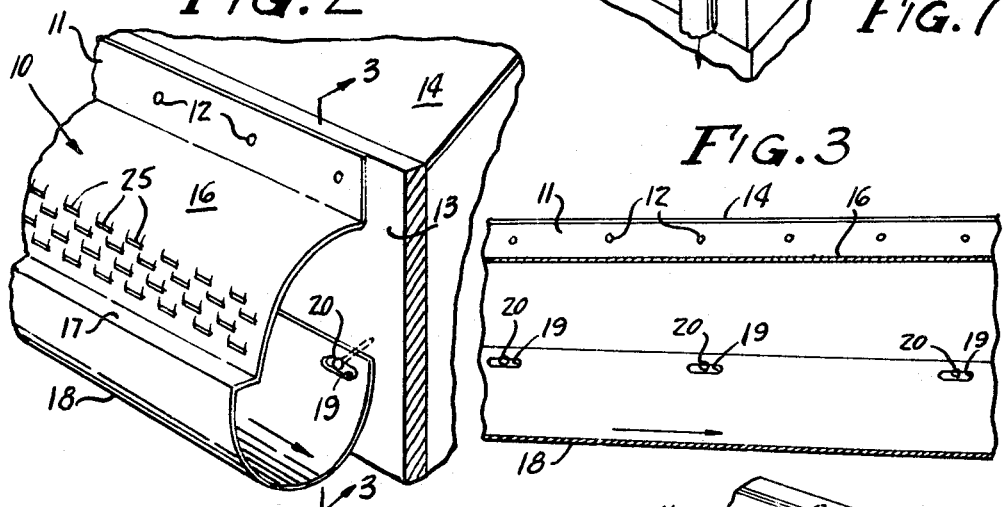
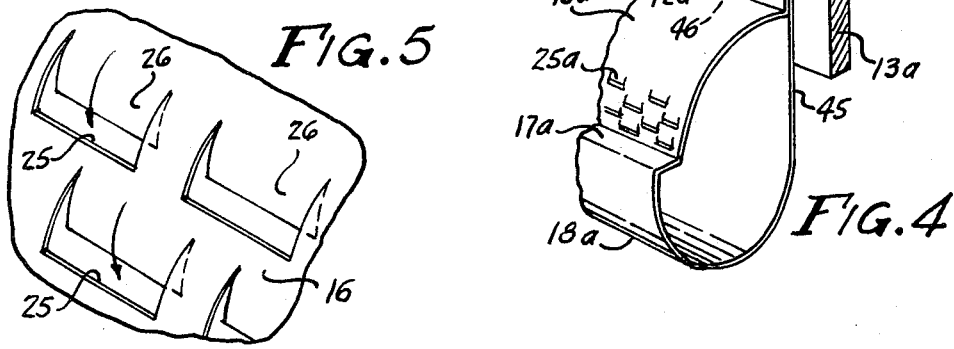
INVENTOR
REX E. FOSTER
Kimmel, Crowell & Weaver
ATTORNEYS.

United States Patent Office 3,388,555
Patented June 18, 1968

3,388,555
SELF-STRAINING EAVES TROUGH
Rex E. Foster, 2415 Garland Ave., Sylvan Lake, Pontiac, Mich. 48053
Filed Oct. 22, 1965, Ser. No. 501,513
6 Claims. (Cl. 61—15)

ABSTRACT OF THE DISCLOSURE

An elongated water conveying conduit having a concave-convex configuration with the concave side opening upwardly; the conduit further including a concave-convex section integrally connected with the aforementioned portion in vertically spaced relationship relative thereto and with the concavities of the portion and section being disposed in confronting relation relative to one another; the portion and section having means at a common side thereof affording connection to a side of a building; and the section having a plurality of openings formed therein extending transversely therethrough to prevent twigs, leaves and other accumulated debris entrained with roof drainage water from entering the conduit and to clog the same.

---

This invention relates to a self-straining eaves trough, and has as its primary object the provision of an eaves trough having an improved perforated cover which will prevent the clogging of the trough with leaves, dirt, small branches, and other debris, which heretofore has been the source of malfunction and inconvenience to the owner of the residence, necessitating periodic cleaning out of the trough, for the purpose of maintaining such troughs in efficient condition.

A further object of the invention is the provision of a device of this character which includes a perforated curvilinear wall disposed in the path of travel of roof drainage water that, by its construction, will prevent the clogging of the trough, and preclude the necessity of such periodic cleaning.

An additional object of the invention is the provision of a trough which includes an outwardly convex portion having a plurality of perforations formed therein, each of which is associated with a flange or baffle to effect a filtering of water from twigs, tree branches and other debris that normally clogs eaves troughs, and which is so constructed that rather than being inclined as is the usual custom with such troughs, and providing an out of line appearance to the dwelling or other building to which it is applied may be so mounted that exteriorly the trough will appear to be perfectly level, but which will at the same time be so positioned as to incline downwardly toward a down spout, the inclination being substantially concealed from the exterior.

A further object of the invention is the provision of a trough of this nature which may be readily and expeditiously applied to any building, with a minimum of time, effort and difficulty.

Still other objects reside in the combination of elements, arrangements of parts, and features of construction, all as will be more fully pointed out hereinafter and disclosed in the accompanying drawings wherein there are shown preferred embodiments of the instant inventive concept.

In the drawings:

FIGURE 1 is a perspective view of one form of trough embodying the instant inventive concept shown as applied to the side wall of a building, or the eaves of the roof, in the usual manner, disclosing also an end cap and the down spout used in conjunction therewith, parts thereof being broken away.

FIGURE 2 is an enlarged perspective view showing the means of attachment of the device to the eaves of the building.

FIGURE 3 is a fragmentary sectional view taken substantially along the line 3—3 of FIGURE 2 as viewed in the direction indicated by the arrow.

FIGURE 4 is a fragmentary view similar to FIGURE 2 showing a modified form of construction.

FIGURE 5 is an enlarged perspective view of the surface of the trough, showing a constructional detail.

FIGURES 6 and 7 are perspective views of a connector and corner piece respectively for use with the trough of this invention.

Similar reference characters refer to similar parts throughout the several views of the drawings.

Having reference now to the drawings in detail, the self-straining trough of the instant invention is generally indicated at 10, and includes a first vertical flange 11, which is adapted to be attached by means of bolts, nails or screws 12 to the upper marginal edge of the eaves 13 of a building at the edge of the roof 14, and above the side wall 15. Immediately adjacent flange 11, and integral therewith is an upwardly and outwardly convexed sheet 16, which extends downwardly to a substantially horizontal lip or ledge 17. The terms upwardly, downwardly, inwardly and outwardly as hereinafter used are employed relative to the normal orientation of the building to which the device is applied.

From the lip 17 a downwardly and inwardly concaved sheet 18 extends rearwardly into contact with the eaves 13, the upper edge thereof adjacent the eaves or side wall of the building being provided with a plurality of elongated relatively wide slots 19 which may be positioned over the heads 20 of nails or screws which are previously positioned in the side of the building or of the eaves, the arrangement being such that while the flange 18 is extended level and flush with the roof line, the lower concaved gutter or trough portion may be downwardly inclined, as indicated by the arrow in FIGURE 3.

The lower inclined edge of convexed portion 16 is provided with a plurality of openings or apertures 25, which, as best shown in FIGURE 5 are substantially rectangular in configuration, and which are characterized at their upper edges by inturned arcuate flanges 26, which serve as deflectors or guides to permit water flowing over the convexed portions 16 to fall inwardly into the trough but which will at the same time deflect all major articles, such as leaves, small branches, or the like over the sides of the openings, and down onto and over the lip 17, from which they may be readily washed by rain or the like.

As best shown in FIGURE 1, end caps may be provided for the ends of each trough, and include arcuate portions which conform in configuration to the concaved trough 18, these portions being indicated at 28, which in turn are provided with end closure plates 29. A relatively short top or cover plate 30 terminates at one side in a relatively flat short plate 31 which overlies the adjacent lip 17, and on its opposite side in an inverted channel-shaped portion 32 which overlies the upper edge of concaved trough 18. The portions 31 and 32 may be readily secured to the trough by soldering, or in any other desired manner. Similarly a down spout 33 may extend from the end cap portion or any other suitable location.

FIGURE 6 discloses a connector for adjacent sections of trough, which are simply comprised of a substantially U-shaped member 35 having a configuration substantially identical to the concave portion 18 which is provided on one side with a flange 36 adapted to overlie adjacent ends of lip 17 and on the other side with the reverted portion 37 which overlies the upper edge of the inner portion of trough 18. FIGURE 7 discloses a corner piece, which consists of a similar trough portion 38, which is bent at a right or other desired angle and an intermediate portion, one edge thereof being provided with a flange 40 overlying the adjacent lip 17, similar to the flange 36, and the other edge of which is provided with a reverted portion 41 similar to the previously described portions 32 and 37.

In FIGURE 4 there is shown modified form of construction which is adapted to be employed when the eaves board 13a is relatively narrow. The construction is substantially identical to that previously described, including a flange 11a, an outwardly convexed portion 16a having openings 25a, a lip 17a and a concaved trough 18a all substantially identical to that of the foregoing modification. However, in this modification the rear of trough 18a is extended upwardly in the form of a straight sheet 45, which may extend into substantial alignment with the upper edge of flange 11a, so that a single nail 12a may be utilized to secure both flanges to the eaves board 13a. If desired, flange 45a may be provided with elongated vertical slots 46, so that an inclination of the inner portion of the trough similar to that obtained by the slots 19 and nails 20 may be achieved through the use of the relative positioning of the upper edge of flange 45 in inclined relation to the upper edge of flange 11a.

From the foregoing it will now be seen that there is herein provided an improved self-straining eaves trough which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted as illustrative and not in a limiting sense.

I claim:

1. A self-straining eaves trough comprising a sheet of metal formed with a first flange adapted to be secured to a building adjacent the roof line, an outwardly convex portion having straining openings therein, a lip at the lower extremity of said outwardly convex portion, an inwardly extending concaved portion extending from said lip inwardly beneath and upwardly towards said outwardly convex portion and defining a trough having an upper marginal edge at the inner end of said concaved portion adapted to be secured to the building, and said upper marginal edge having slotted openings formed therein for the reception for securing means therethrough, said openings being dimensioned to permit the inclination of the concave portion along the roof line while permitting the first flange to extend parallel to the roof line.

2. The structure of claim 1 wherein the straining openings are formed with inwardly extending second flanges defining fluid guides.

3. The structure of claim 2 wherein said openings are rectangular and said second flanges extend from the top edges thereof and are arcuate in cross section.

4. The structure of claim 1 wherein end caps are provided for said eaves trough, each end cap including a channel portion having a reverted edge extending over the top of the upper marginal edge of said inwardly extending concaved portion, a flange extending over the top of said lip, and an end plate.

5. The structure of claim 1 wherein said upper marginal edge is elongated and adapted to be secured beneath said first flange along the roof line.

6. The structure of claim 1 wherein said straining openings extend in a plane substantially parallel to the side walls of the building.

References Cited

UNITED STATES PATENTS

| | | | |
|---|---|---|---|
| 174,281 | 2/1876 | Moulton | 61—15 |
| 803,670 | 11/1905 | Crawford | 52—12 |
| 891,405 | 6/1908 | Cassens | 52—12 X |
| 2,219,953 | 10/1940 | Fry | 52—12 |
| 2,271,081 | 1/1942 | Layton | 52—12 |

JOHN E. MURTAGH, *Primary Examiner.*